US008512446B2

(12) United States Patent
Mazumdar et al.

(10) Patent No.: US 8,512,446 B2
(45) Date of Patent: Aug. 20, 2013

(54) HIGH PRESSURE CONVEYANCE GAS SELECTION AND METHOD OF PRODUCING THE GAS

(75) Inventors: Anindra Mazumdar, Katy, TX (US); John Saunders Stevenson, Yorba Linda, CA (US); Sunil Ramabhilakh Mishra, Pearland, TX (US)

(73) Assignee: General Electric Company, Schenectady, NY (US)

( * ) Notice: Subject to any disclaimer, the term of this patent is extended or adjusted under 35 U.S.C. 154(b) by 370 days.

(21) Appl. No.: 12/841,994

(22) Filed: Jul. 22, 2010

(65) Prior Publication Data
US 2012/0017562 A1 Jan. 26, 2012

(51) Int. Cl.
*B01D 53/14* (2006.01)

(52) U.S. Cl.
USPC .................. 95/172; 95/176; 95/236; 60/39.12

(58) Field of Classification Search
USPC .............. 60/39.12; 48/61, 210, 86 R, 197 R; 423/648.1, 650; 95/172, 176, 236
See application file for complete search history.

(56) References Cited

U.S. PATENT DOCUMENTS

| 6,086,722 | A | 7/2000 | Webster, Jr. et al. |
| 8,252,091 | B2 * | 8/2012 | Anand et al. ..................... 95/172 |
| 2008/0145156 | A1 | 6/2008 | Livingood et al. |
| 2009/0019767 | A1 * | 1/2009 | Abughazaleh et al. ........... 48/61 |
| 2009/0107046 | A1 | 4/2009 | Leininger et al. |
| 2009/0158664 | A1 * | 6/2009 | Kim et al. ......... 48/210 |
| 2009/0178338 | A1 * | 7/2009 | Leininger et al. ............. 48/86 R |
| 2009/0199474 | A1 | 8/2009 | Leininger et al. |
| 2009/0202403 | A1 | 8/2009 | Jimenez-Huyke et al. |
| 2009/0272821 | A1 | 11/2009 | Guo et al. |
| 2009/0272822 | A1 | 11/2009 | Davis et al. |
| 2010/0043290 | A1 | 2/2010 | Thacker et al. |
| 2011/0162381 | A1 * | 7/2011 | Thacker et al. .................. 60/780 |
| 2011/0173885 | A1 * | 7/2011 | Davey et al. ...................... 48/61 |

OTHER PUBLICATIONS

U.S. Appl. No. 12/831,174, filed Jul. 6, 2010, Anindra Mazumdar et al.

* cited by examiner

*Primary Examiner* — Robert A Hopkins

(74) *Attorney, Agent, or Firm* — Fletcher Yoder, P.C.

(57) ABSTRACT

A method is provided that includes removing carbon dioxide from untreated syngas received from a gasifier to produce a gas stream comprising carbon dioxide, modifying the gas stream by adding carbon monoxide, hydrogen, hydrogen sulfide, or any combination thereof, and providing the gas stream from an acid gas remover to a feed system for use as a conveyance gas to convey a feedstock into the gasifier. Systems implementing these and other methods are also provided.

20 Claims, 4 Drawing Sheets

HIGH PRESSURE CONVEYANCE GAS SELECTION AND METHOD OF PRODUCING THE GAS

BACKGROUND OF THE INVENTION

The subject matter disclosed herein relates to carbon dioxide recycling and acid gas removal in a power plant.

In general, integrated gasification combined cycle (IGCC) power plants are capable of generating energy from various hydrocarbon feedstock, such as coal, relatively cleanly and efficiently. IGCC technology may convert the hydrocarbon feedstock into a gas mixture of carbon monoxide (CO) and hydrogen ($H_2$), i.e., syngas, by reaction with oxygen and steam in a gasifier. These gases may be sweetened, processed, and utilized as fuel in a conventional combined cycle power plant. For example, the syngas may be fed into a combustor of a gas turbine of the IGCC power plant and ignited to power the gas turbine for use in the generation of electricity.

The gasifier generally receives the hydrocarbon feedstock from a feed system, such as a dry feed system. For example, the dry feed system may use a conveyance gas. Unfortunately, the conveyance gas may be limited to various factors, such as the pressure of the gasifier, the critical pressure of the conveyance gas, and availability of the conveyance gas. Also undesirable amounts of the conveyance gas may accumulate in the system or syngas.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes capturing carbon dioxide from untreated syngas generated by a gasifier to produce a gas stream that includes carbon dioxide, modifying the gas stream by adding carbon monoxide, hydrogen, hydrogen sulfide, or any combination thereof, and providing the gas stream from an acid gas remover to a feed system for the gasifier, for use as a conveyance gas to convey a feedstock into the gasifier.

In a second embodiment, a system includes a gas processing system configured to deliver a carbon dioxide stream from an acid gas remover, modify the composition of the carbon dioxide stream to decrease the partial pressure of carbon dioxide so that the partial pressure is lower than a critical pressure of carbon dioxide; and provide a modified carbon dioxide stream to a feed system for a gasifier In a third embodiment, a system includes a feed system configured to convey feedstock using a conveyance gas, a gasifier configured to receive the feedstock from the feed system, a gas processing system configured to receive an output from the gasifier, wherein the gas processing system outputs a gas stream for use as the conveyance gas, wherein syngas is added to the gas stream.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present invention include a conveyance gas system and process for a gasification system having an acid gas remover (AGR). Carbon dioxide from the acid gas remover may be recycled to the feed system for use as a conveyance gas. The present disclosure provides multiple embodiments for increasing the partial pressure of carbon dioxide in the recycle stream. In one embodiment, sweet or treated syngas from the AGR may be added to the carbon dioxide recycle stream. In another embodiment, untreated syngas may be added to the carbon dioxide recycle steam. In yet other embodiments, the flash pressure of the AGR may be selected to achieve a desired composition of recycle gas. Further, any one or combination of the above techniques may be combined in an embodiment.

Figure 1:
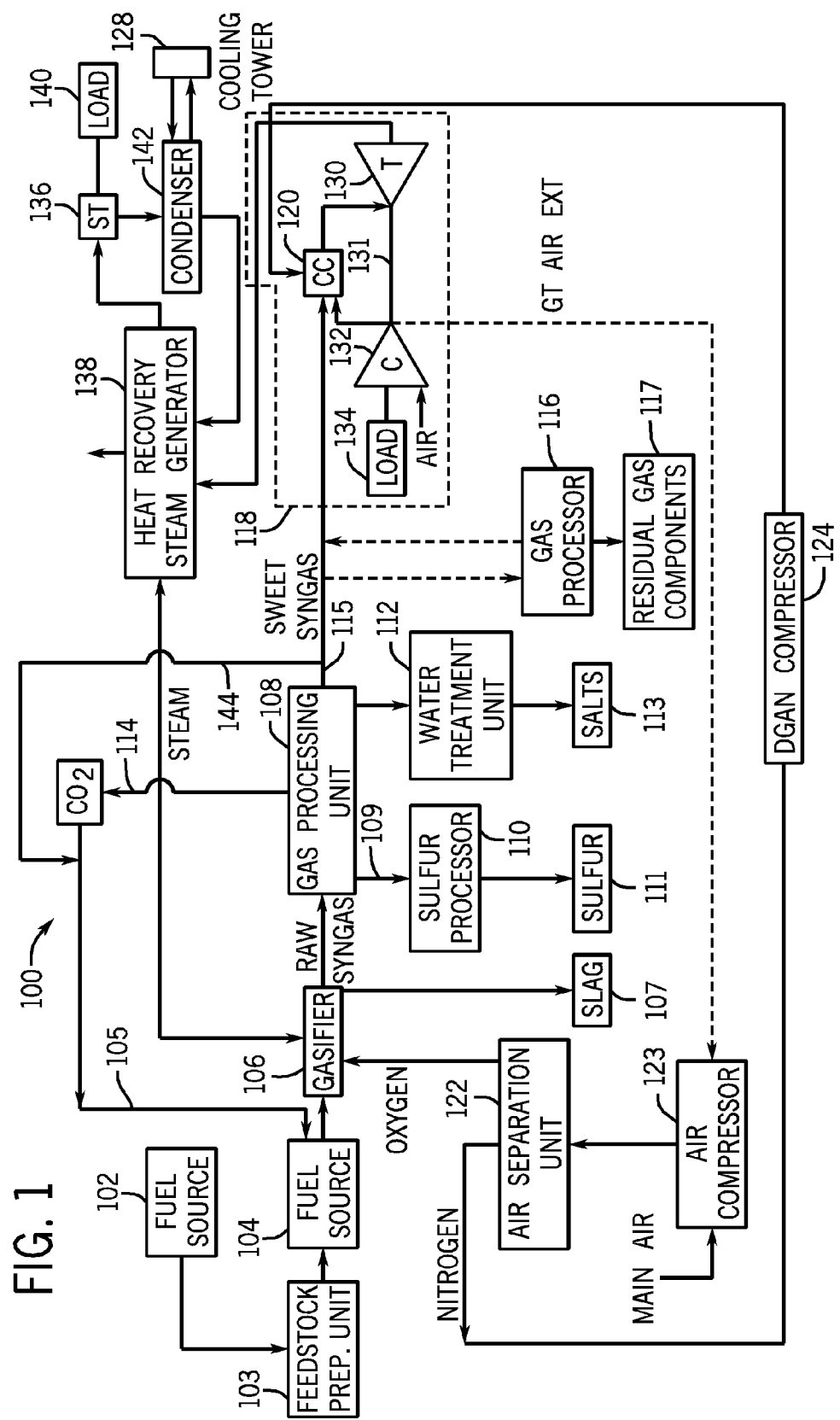
FIG. 1 is a schematic block diagram of an integrated gasification combined cycle (IGCC) power plant having treated syngas added to a carbon dioxide recycle stream in accordance with an embodiment of the present invention.

FIG. 1 is a diagram of an embodiment of an integrated gasification combined cycle (IGCC) system 100 that may be powered by synthetic gas, i.e., syngas. Elements of the IGCC system 100 may include a fuel source 102, such as a solid feed, that may be utilized as a source of energy for the IGCC. The fuel source 102 may include coal (including low sulfur content coal), petroleum coke, biomass, wood-based materials, agricultural wastes, tars, coke oven gas and asphalt, or other carbon containing items.

The solid fuel of the fuel source 102 may be passed to a feedstock preparation unit 103. The feedstock preparation unit 103 may, for example, resize or reshape the fuel source 102 by chopping, milling, shredding, pulverizing, briquetting, or palletizing the fuel source 102 to generate feedstock. The prepared feedstock may then be passed to a feed system 104 that may pressurize the feedstock using a conveyance gas 105 and a pump or other suitable mechanism. Such a feed system may be referred to as a dry feed system or a posimetric feed system. In some embodiments, the feed system 104 may operate at pressures greater than at least 1000 psia. As described further below, the conveyance gas 105 may be received from a modified carbon dioxide recycle stream from an AGR.

The feedstock may be passed to a gasifier 106 from the feedstock preparation unit 104. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius-1600 degrees Celsius, depending on the type of gasifier 106 utilized. The gasification process may include the feedstock undergoing a pyrolysis process, whereby the feedstock is heated. Temperatures inside the gasified 106 may range from approximately 150 degrees Celsius to 700 degrees Celsius during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees Celsius to 1600 degrees Celsius. Next, steam may be introduced into the gasifier 106 during a gasification step. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and energy, which drives a second reaction that converts further feedstock to hydrogen and additional carbon dioxide.

In this way, a resultant gas is manufactured by the gasifier 106. This resultant gas may include approximately 85% of carbon monoxide and hydrogen, as well as $CH_4$, HCl, HF, COS, $NH_3$, HCN, and $H_2S$ (based on the sulfur content of the feedstock). This resultant gas may be termed raw or untreated syngas and may include less than approximately 20 percent by volume $H_2S$. The gasifier 106 may also generate waste, such as slag 107, which may be a wet ash material. This slag 107 may be removed from the gasifier 106 and disposed of, for example, as road base or as another building material.

To treat the untreated syngas, a gas processing unit 108 may be utilized. The gas processing unit 108 may include an AGR and may treat the untreated syngas to remove the HCl, HF, COS, HCN, and $H_2S$ from the untreated syngas, which may include separation of and transmission of $H_2S$ rich acid gas to a sulfur processor 110 via path 109. The acid gas may be processed by the sulfur processor 110 to generate sulfur 111. Furthermore, the gas processing unit 108 may separate salts 113 from the untreated syngas via a water treatment unit 112 that may utilize water purification techniques to generate usable salts 113 from the untreated syngas. The gas processing unit 108 may produce carbon dioxide ($CO_2$), whereby the $CO_2$ is removed from the untreated syngas and is transmitted to a recycle stream 114. As described further below, the carbon dioxide recycle stream 114 may be recycled to the feed unit 104 as the conveyance gas 105. As used herein, the term "carbon dioxide recycle stream" refers to the stream output from the gas processing unit that includes $CO_2$, such as at least about 90% $CO_2$ by volume. However, it should be appreciated that the carbon dioxide recycle stream may include other compounds from the treating process, such as $H_2S$, CO, and $H_2$ or other compounds.

Subsequent to the processes described above, the gas exiting the gas processing unit 108 along path 115 may include treated syngas, e.g., substantially free from sulfur, as well as residual gas components such as $NH_3$ (ammonia). At this point, the treated syngas may include primarily $H_2$ and $CO_2$, smaller amounts of CO, and may be substantially stripped of $H_2S$. It should be noted that based on the level of $CO_2$ capture accomplished in the gas processing unit 108, the percentage of CO and $H_2$ in the treated syngas may increase. This treated syngas may be transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases may force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

As noted above, the gas processing unit 108, e.g. an AGR, may capture $CO_2$ from the untreated syngas for use in the recycle stream 114. This recycle stream 114 may be recycled for use as the conveyance gas 105 in the feed system 104. However, in certain embodiments having a relatively high pressure feed system 104, the $CO_2$ composition of the recycle stream 114 may be unsuitable for use in the feed system 104, as $CO_2$ has a critical pressure of approximately 1070 psi. As shown in FIG. 1, treated syngas 144 may be added to the recycle stream 114. The treated syngas 144 may be added from the treated syngas output (path 115) of the gas processing unit 108. As noted above, because the treated syngas 144 from the gas processing unit 108 includes CO and $H_2$ (and, in some embodiments, $H_2S$), the partial pressure of $CO_2$ in the modified recycle stream may be lower than the critical pressure of $CO_2$, ensuring suitability of the recycle stream 114 for the conveyance gas 105. Thus, the conveyance gas 105 may be pressurized to the desired pressures of the feed system 104. Further, any excess CO and $H_2$ from the treated syngas will be processed in the gasifier and will not accumulate in the system.

Figure 2:
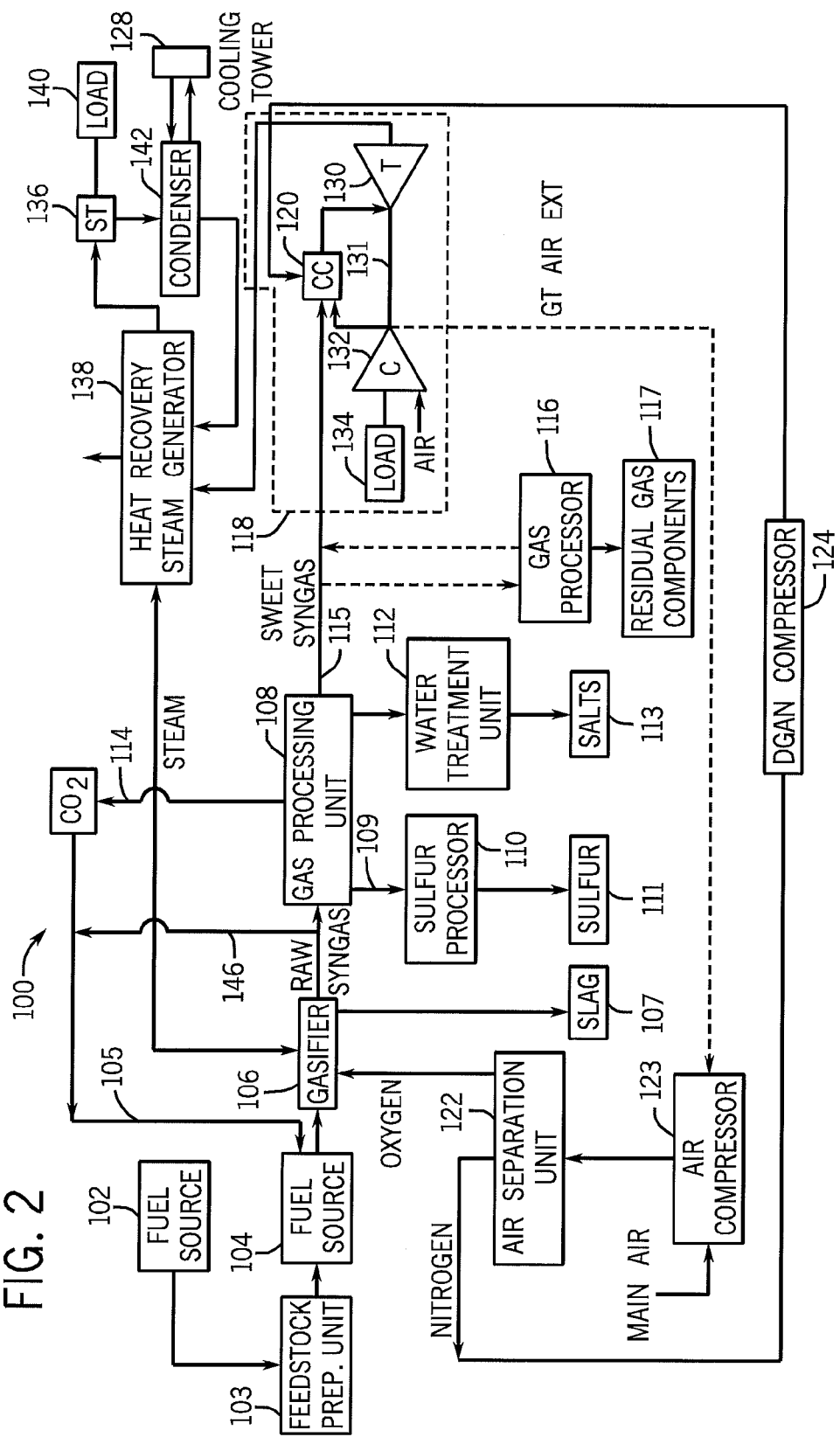
FIG. 2 is a schematic block diagram of the IGCC power plant of FIG. 1 having untreated syngas added to a carbon dioxide recycle stream in accordance with another embodiment of the present invention.

In other embodiments, the recycle stream 114 may be modified by adding untreated syngas to the recycle stream 114. FIG. 2 depicts another embodiment of the IGCC system 100 in which untreated syngas 146 is added to the recycle stream 114. As described above, the gas processing unit 108, e.g., an AGR, may capture $CO_2$ from the untreated syngas for the recycle stream 114 to provide a conveyance gas 105 for the feed system 104. To enable increased pressure of the conveyance gas 105, untreated syngas 146 may be added to the recycle stream 114. The untreated syngas 146 may be added from the untreated syngas output from the gasifier 106. As noted above, because the raw syngas 146 may include CO, $H_2$, and, depending on the composition of the feedstock, $H_2S$, the partial pressure of $CO_2$ in the modified recycle stream 114 may be lower than a critical pressure of $CO_2$. Thus, the conveyance gas 105 may be pressurized to a higher pressure than an unmodified recycle stream that includes greater amounts of $CO_2$. Further, any excess CO, $H_2$, and $H_2S$ from the treated syngas will be processed in the gasifier and will not accumulate in the system.

Figure 3:
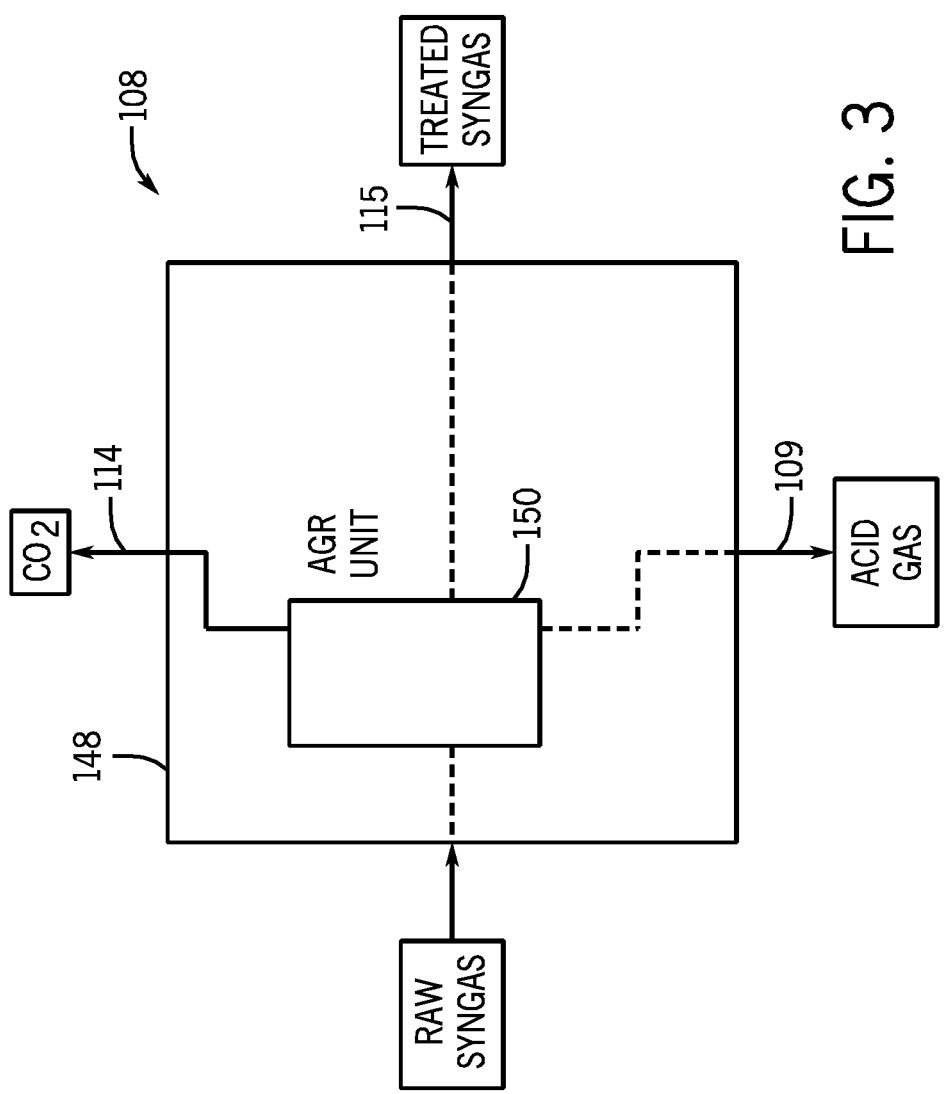
FIG. 3 is a schematic block diagram of a first embodiment of elements of an acid gas remover (AGR) unit of FIGS. 1 and 2.

In other embodiments, the output of the gas processing unit 108 may be modified, such as through modification of the pressure of a flash process of the AGR, to modify the composition of the carbon dioxide recycle stream 114. FIG. 3 illustrates a schematic block diagram of an embodiment of the gas processing unit 108 discussed above. The gas processing unit 108 may include an AGR unit 148 that operates to remove, for example, $H_2S$ and $CO_2$ from received untreated syngas, which may have been generated from a low sulfur fuel source, such as, low sulfur content coal, leading to lower concentrations of $H_2S$ (approximately less than 0.1, 0.2, 0.5, 1, or 2% $H_2S$ by volume) in the untreated syngas. In one embodiment, the AGR unit 148 may receive the untreated syngas, and may process the untreated syngas to produce ($H_2S$ rich) acid gas, for transmission along path 109. Additionally, the AGR unit 148 may process the untreated syngas to produce the $CO_2$ recycle stream 114. Finally, by removing the $H_2S$ and $CO_2$ from the received untreated syngas, the AGR unit 148 may generate treated syngas for transmission along path 115. In this manner, the AGR unit 148 may operate to "sweeten" the untreated syngas (i.e., remove acid gas from the untreated syngas, as well as $CO_2$ from the untreated syngas).

The AGR unit 148 may include a $CO_2$ recovery unit which may include a single flash tank or a multi-set of flash tanks 150 (e.g., a manifold, group, or bank of flash tanks). The flash tanks may be tanks used to separate gases from liquids via pressure reductions in the tanks. That is, if the vapor pressure of the gas dissolved in the solvent is greater than the pressure in a given tank, then the gas will separate (e.g., escape) from the solvent. The amount of gas that separates from the solvent may be based on various factors such as the type of solvent, the operating temperature of the flash tank, and/or the pressure inside of the flash tank. Thus, the composition of the $CO_2$ stream may be modified by modifying the flash pressure. By modifying the composition of the $CO_2$ stream, the partial pressure of $CO_2$ in the recycle stream may be lower than the critical pressure of $CO_2$, thus enabling an increase in the pressure of the conveyance gas fed from the recycle stream.

The $CO_2$ recycle stream may include, for example, approximately 90% $CO_2$ by volume, with the remainder including $H_2S$. That is, the $CO_2$ stream transmitted along path 114 may include at least equal to or greater than approximately 90%, 95%, or more $CO_2$ by volume. Furthermore, the amount of $H_2S$ in the $CO_2$ may be modified by changing the pressure of the solvent in the flash tank(s) of the recovery unit 150. For example, to increase the $H_2S$ in the $CO_2$ stream, the pressure of the solvent in the flash tank(s) may be lowered to between about 100 psi and 250 psi In one embodiment, the acid gas transmitted along path 109 may include at least approximately 25% $H_2S$ by volume, even if generated from low sulfur content fuel. That is, the acid gas transmitted along path 109 may include at least equal to or greater than approximately 25%, 30%, 35%, 40%, or more $H_2S$ by volume. Finally, the sweet syngas transmitted along path 115 may include at most approximately 25 ppm $H_2S$. Further, the AGR 148 may be configured to allow for proper sulfur recovery from the acid gas and may meet, for example, certain environmental regulations for the use of $CO_2$ in applications such as enhanced oil recovery as well as certain environmental regulations relating to the use of syngas as a fuel source in the IGCC system 100.

It should be appreciated that embodiments of the present invention may use any one or combination of the above techniques for modifying the recycle stream 114. For example, an embodiment of the IGCC system 100 may include modifying the recycle stream 114 by adding sweet syngas 144, adding untreated syngas 146, and/or modifying the AGR 148 to increase $H_2S$ in the recycle stream 114. Further, although the embodiments of FIGS. 1 and 2 depict the sweet syngas output of the gas processing unit 108 used in an IGCC system 100, in other embodiments the sweet syngas output may be used as fuel for any suitable process and system.

Figure 4:
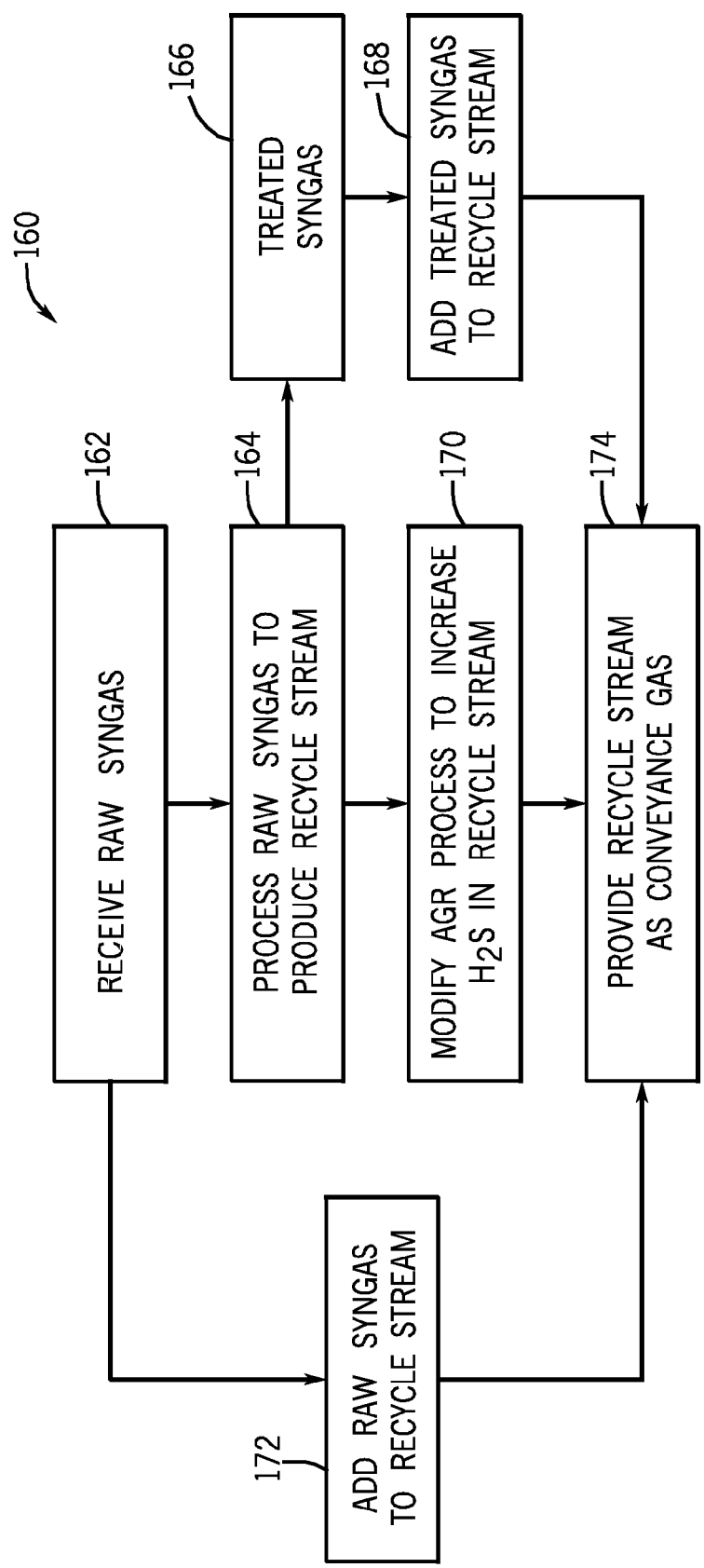
FIG. 4 is a flowchart of a process for modifying a carbon dioxide recycle stream from an AGR in accordance with an embodiment of the present invention.

FIG. 4 depicts a process 160 for producing a conveyance gas from a modified recycle stream in accordance with an embodiment of the present invention. As discussed above, the process 160 may be implemented in the IGCC system 100 or any other system having a gasifier and gas processing unit for the production of sweet syngas. Initially, untreated syngas may be received by the gas processing unit 108 (block 162), such as from the gasifier 106. The untreated syngas may be processed to produce the $CO_2$ recycle stream 114 (block 164) and to treat the syngas to produce sweet syngas (block 166).

As described above, the composition of the recycle stream 114 may be modified to enable use as a high pressure conveyance gas in the feed system 104. As described above in FIG. 1, some of the sweet syngas output from the gas processing unit 108 may be added to the recycle stream (block 168), thus adding or increasing CO and $H_2$ in the recycle stream. Additionally, as described above in FIG. 3, the AGR process in the gas processing unit 108 may be modified to increase $H_2S$ in the recycle stream 114 (block 170), such as by lowering the pressure of the solvent used in a flash tank(s). Finally, as described above in FIG. 2, untreated syngas from the gasifier 106 may be added to the recycle stream 114 (block 172), thus adding or increasing CO, $H_2S$, and $H_2$ in the recycle stream. The modified recycle stream 114 may be provided as the conveyance gas 105 of the feed system 104 (block 174). As described above, the decreased partial pressure of $CO_2$ in the recycle stream 114 may enable greater pressurization of the recycle stream 114 when used as the conveyance gas 105, without the concern of exceeding the critical pressure of a stream richer in $CO_2$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
    capturing carbon dioxide from untreated syngas generated by a gasifier to produce a gas stream comprising carbon dioxide;
    modifying the gas stream by adding at least one of carbon monoxide, hydrogen, hydrogen sulfide, or any combination thereof, to produce a modified gas stream with a partial pressure of the carbon dioxide less than a critical pressure of the carbon dioxide; and
    providing the modified gas stream to a feed system for use as a conveyance gas to convey a feedstock into the gasifier.

2. The method of claim 1, wherein modifying the gas stream comprises adding treated syngas from a gas processing unit to the gas stream to produce the modified gas stream.

3. The method of claim 1, wherein modifying the gas stream comprises adding untreated syngas from the gasifier to the gas stream to produce the modified gas stream.

4. The method of claim 1, wherein modifying the gas stream comprising modifying a flash process of a gas treatment unit to produce the modified gas stream.

5. The method of claim 4, wherein modifying the flash process comprises adjusting a pressure of a solvent used in a flash tank to produce the modified gas stream.

6. The method of claim 1, wherein the feed system comprises a dry feed system.

7. The method of claim 6, wherein is a solid feed system configured to convey particulate coal.

8. The method of claim 1, comprising removing hydrogen sulfide from the untreated syngas in an acid gas remover to produce the modified gas stream.

9. The method of claim 1, wherein the conveyance gas of the feed system is at a higher pressure than the gasifier.

10. A system, comprising:
    a gas processing system configured to:
        deliver a carbon dioxide stream from an acid gas remover;
        modify a composition of the carbon dioxide stream to produce a modified carbon dioxide stream by decreasing a partial pressure of the carbon dioxide so that the partial pressure of the carbon dioxide is lower than a critical pressure of the carbon dioxide; and
    provide the modified carbon dioxide stream to a feed system for a gasifier.

11. The system of claim 10, wherein the gas processing system is further configured to modify the composition of the carbon dioxide stream by adding untreated syngas to the carbon dioxide stream to produce the modified carbon dioxide stream.

12. The system of claim 10, wherein the gas processing system is further configured to modify the composition of the carbon dioxide stream by adding treated syngas to the carbon dioxide stream to produce the modified carbon dioxide stream.

13. The system of claim 10, wherein the gas processing system is further configured to modify the composition of the carbon dioxide stream by modifying the acid gas remover to increase hydrogen sulfide in the carbon dioxide stream to produce the modified carbon dioxide stream.

14. The system of claim 10, wherein the gas processing system is further configured to provide the modified carbon dioxide stream as a conveyance gas for a dry feed system for the gasifier.

15. A system, comprising:
a feed system configured to convey a feedstock using a conveyance gas;
a gasifier configured to receive the feedstock from the feed system; and
a gas processing system configured to receive a gas stream having a syngas output from the gasifier, wherein the gas processing system is configured to modify a composition of the gas stream to produce a modified gas stream for use as the conveyance gas, the modified gas stream comprises carbon dioxide, and a partial pressure of the carbon dioxide is less than a critical pressure of the carbon dioxide.

16. The system of claim 15, wherein untreated syngas, sweet syngas, or a combination thereof, is added to the gas stream to produce the modified gas stream.

17. The system of claim 15, wherein the gas processing system comprises an acid gas remover configured to remove carbon dioxide from the output of the gasifier to produce the modified gas stream.

18. The system of claim 15, wherein the gas processing unit comprises an acid gas remover configured to remove hydrogen sulfide from the output from the gasifier to produce the modified gas stream.

19. The system of claim 15 comprising a gas turbine engine configured to receive a second gas stream from the gas processing system.

20. The system of claim 15, wherein the feed system comprises a posimetric feed system.

* * * * *